Sept. 11, 1951 K. B. BENGTSON 2,567,419
RECOVERY OF MAGNESIUM FROM SILICEOUS MAGNESIUM MINERALS
Filed June 5, 1948
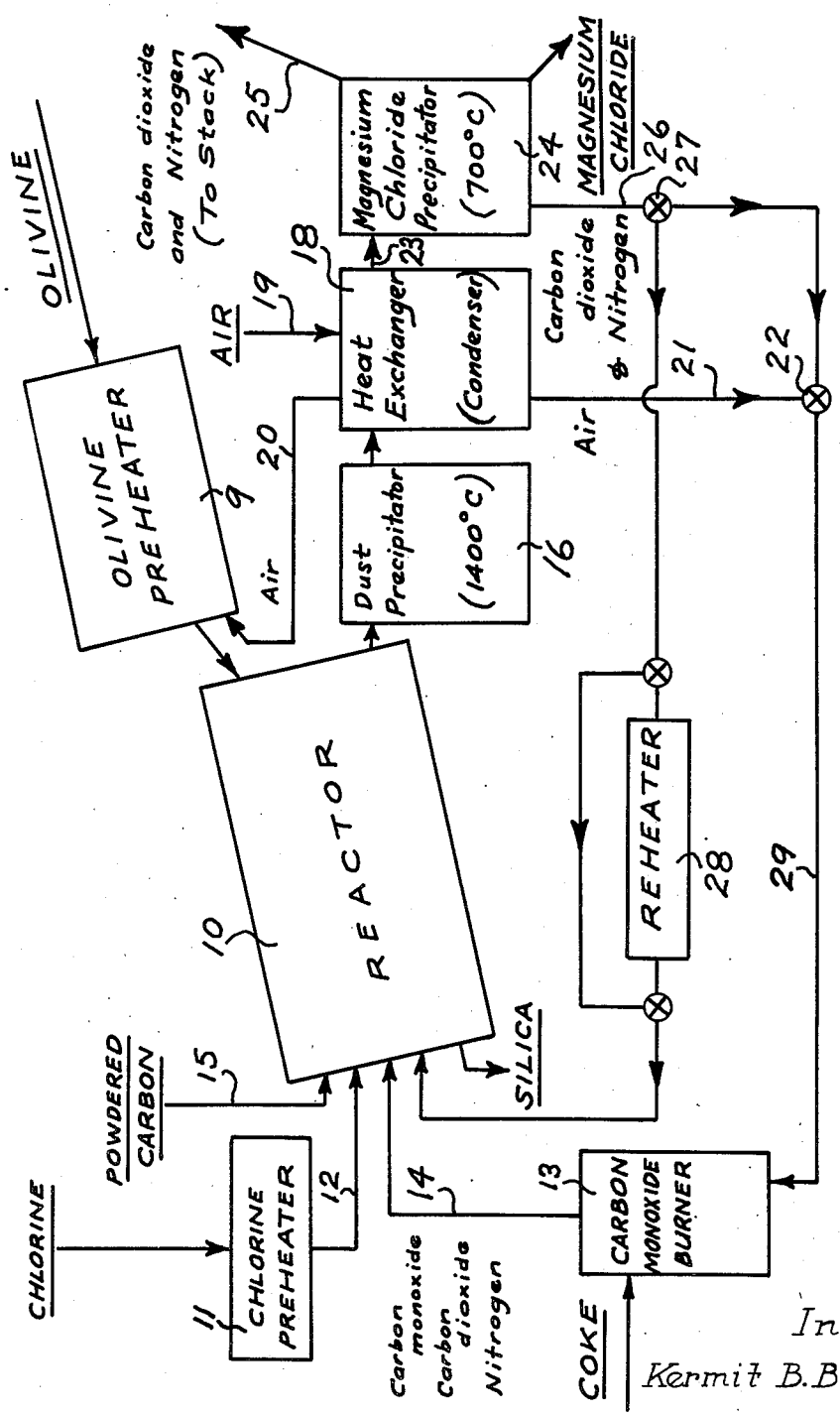
Inventor
Kermit B. Bengtson
By Arnold and Mathis
Attys Patented Sept. 11, 1951

2,567,419

UNITED STATES PATENT OFFICE 2,567,419

RECOVERY OF MAGNESIUM FROM SILICEOUS MAGNESIUM MINERALS

Kermit B. Bengtson, Seattle, Wash.

Application June 5, 1948, Serial No. 31,243

17 Claims. (Cl. 23—67)

The present invention relates to a process for the recovery of magnesium from siliceous magnesium minerals. It pertains particularly to a process for the recovery from siliceous magnesium minerals of magnesium in the form of magnesium chloride, which process comprises chlorinating the magnesia content of the mineral, and separating the resulting volatile magnesium chloride from the non-volatile residue substantially comprising silica.

At the present time the element magnesium and its compounds are obtained commercially from sources such as sea water, brines, magnesite (magnesium carbonate), brucite (magnesium hydroxide), carnallite (a hydrated double salt of potassium chloride and magnesium chloride) and the like, which lend themselves readily to conventional smelting and refining techniques. In addition to these sources, however, there are vast deposits of relatively inexpensive siliceous magnesium minerals which currently are not employed as sources of magnesium and its compounds because, heretofore, it has been considered impractical and uneconomical to recover magnesium therefrom.

Typical of such siliceous magnesium minerals are the following:

Olivine — magnesium orthosilicates generally ($Mg_2SiO_4$).

Forsterite—a magnesium orthosilicate of the olivine type ($Mg_2SiO_4$).

Dunite—a mixture containing or comprising forsterite and fayalite

Serpentine—weathered olivine; hydrated magnesium silicate ($Mg_3Si_2O_7 \cdot 2H_2O$).

Enstatite—magnesium metasilicate ($MgSiO_3$).

Siliceous magnesite—magnesite containing silica as an impurity.

Siliceous brucite—brucite containing silica as an impurity.

The present invention is directed to the provision of a practical and economical process for recovering magnesium from the foregoing and other siliceous magnesium minerals. It is applicable generally to any siliceous magnesium mineral comprising essentially magnesia and silica or yielding these materials upon calcination. It is particularly applicable to the mineral olivine and is described with reference thereto, although no limitation is intended thereby.

In carrying out the process of the invention, the olivine or other siliceous magnesium mineral is reduced to the form of particles, in order to provide a relatively large surface area. It is also subjected to a preliminary heat treatment or calcination which drives off any moisture, either combined or uncombined, and serves to preheat the substance to substantially the reaction temperature and incidentally to convert to magnesium oxide any magnesium carbonate which may be present in the mineral.

The calcined material next is introduced into a reactor where it is subjected to the action of a volatile chlorinating agent, thereby selectively converting its magnesia content to magnesium chloride. This, in contradistinction to the siliceous residue, is volatile and hence may be separated from the latter by volatilization at the high temperature prevailing in the reactor. This feature of the invention is of particular significance, since the magnesium chloride is obtained as an anhydrous solid. As is well known, where it is attempted to isolate magnesium chloride from inert residues by leaching or other methods involving the use of water, the magnesium chloride is obtained in hydrated form, which is difficult to convert to the anhydrous product because it hydrolyzes readily to form magnesium oxide.

By the term "volatile chlorinating agent" as used herein are comprehended chlorine gas as well as chlorine containing compounds which may be converted to the vapor state by the application of heat. Illustrative of such chlorine containing compounds are silicon tetrachloride, silicon hexachloride, aluminum chloride, titanium tetrachloride, titanium trichloride, sulfur monochloride, sulfur dichloride, sulfur tetrachloride, sulfuryl chloride, carbon tetrachloride, chloroform, hexachloro ethane, pentachloro ethane, and the like. These and other similar materials act as selective chlorinating agents under the conditions of the reaction either per se or because of their decomposition at high temperatures to form elementary chlorine.

When chlorine and certain chlorinating agents such as sulfuryl chloride are used, it is necessary to effect the chlorination reaction in the presence of a reducing agent. Carbon monoxide, or a mixture of carbon monoxide and carbon, preferably are employed for this purpose, because of their effective action and because their introduction into the reaction mixture does not result in the occurrence of uncontrollable undesirable side reactions.

The reactions occurring when olivine is reacted with chlorine in the presence of carbon monoxide and carbon are complex, but may be illustrated generally by the following equations:

(1) $Mg_2SiO_4 + 2Cl_2 + 2CO = SiO_2 + 2MgCl_2 + 2CO_2 + heat$ (2) $SiO_2 + 2Cl_2 + 2CO = SiCl_4 + 2CO_2 + heat$ (3) $SiO_2 + 2Cl_2 + 2C = SiCl_4 + 2CO + heat$ (4) $Mg_2SiO_4 + SiCl_4 = 2SiO_2 + 2MgCl_2 - heat$ (5) $Mg_2SiO_4 + 2C + 2Cl_2 = 2MgCl_2 + SiO_2 + 2CO - heat$ (6) $Mg_2SiO_4 + 4SiCl_4 + 2CO = 2MgCl_2 + 2CO_2 + SiO_2 + 2Si_2Cl_6 + heat$ (7) $SiO_2 + 2CO + 3SiCl_4 = 2Si_2Cl_6 + 2CO_2 + heat$ (8) $CO_2 + C = 2CO - heat$ The reaction indicated by the first equation is the principal and desired reaction occurring in the reactor. By means of it, the magnesium content of the olivine is chlorinated selectively to form magnesium chloride, which is volatile, while the silica content of the olivine remains unaffected. The reaction is highly exothermic, a factor which is of considerable importance with regard to temperature control, as is discussed more fully below.

The second equation illustrates a reaction occurring as a side reaction, particularly where an excess of chlorine is present in the reactor. By it, a certain proportion of the silica content of the olivine is converted to silicon tetrachloride. This reaction is even more highly exothermic than the first. If it takes place to too great an extent, there will be fusion of the reaction substances and the desired reaction will not continue sufficiently to provide the desired results.

The third equation represents a reaction whereby the silica content of the olivine reacts with the chlorine and carbon present in the reaction mixture to form silicon tetrachloride and carbon monoxide. This exothermic reaction may occur to a limited extent where an excess of carbon is in contact with the olivine. Like the reaction of Equation 2, the extensive occurrence of this reaction is undesirable since it may result in the loss of chlorine.

The reaction of Equation 4 whereby the olivine is chlorinated selectively by the silicon tetrachloride formed by the reactions of Equations 2 and 3 to form the desired magnesium chloride will occur when the reaction conditions are such that we have silicon tetrachloride present in the absence of carbon monoxide. In contrast to the reaction of the first three equations, this reaction is endothermic.

A further reaction which may occur to a limited extent is indicated by Equation 5. This represents the conversion of the olivine to magnesium chloride and silica by the combined action of carbon and chlorine. It is endothermic and may occur where a high concentration of carbon comes in contact with the olivine.

Other side reactions which may occur are indicated in Equations 6 and 7 wherein silicon trichloride is formed by the action of carbon monoxide and silicon tetrachloride on olivine and silica, respectively. These reactions which are exothermic are to be avoided as far as possible by arranging the composition of the in-put gases to the reactor so that the carbon monoxide concentration in the exit gases is very low or zero, thus permitting the silicon tetrachloride to enter only into reaction 4. Previously attempts to chlorinate olivine economically have failed because a large percentage of the silica has always chlorinated and the silicon chlorides formed are lost in the stack gases. My process eliminates this difficulty because through the successive reduction of the carbon monoxide content of the gases throughout the reactor the formation of additional silicon chlorides is prevented while all of that previously formed is being used up according to reaction 4.

The reaction of Equation 8 whereby carbon combines with carbon dioxide to form carbon monoxide is of especial significance in connection with the herein described process. In contrast with the reaction between olivine and chlorine in the presence of carbon monoxide, it is endothermic and hence affords a means of temperature control.

Reactions occurring when volatile chlorinating agents other than chlorine itself are employed in the process of the present invention are indicated by the following equations:

(9) $Mg_2SiO_4 + CCl_4 = 2MgCl_2 + SiO_2 + CO_2$
(10) $Mg_2SiO_4 + 2TiCl_4 = 2MgCl_2 + SiO_2 + TiO_2$
(11) $Mg_2SiO_4 + 2SO_2Cl_2 + 6CO =$
$2MgCl_2 + SiO_2 + 6CO_2 + 2S$

Equation 9 typifies those reactions wherein olivine is chlorinated by a highly chlorinated hydrocarbon, in this case carbon tetrachloride. In these cases, the magnesia content of the olivine is converted selectively to magnesium chloride the silica content being unaffected and the chlorinated hydrocarbon being converted to carbon dioxide.

Equation 10 is a typical reaction occurring when a chloride of titanium, in this case titanium tetrachloride, is reacted with olivine. Here again the magnesium content of the olivine is selectively converted to magnesium chloride, the silica content being unaffected, and the titanium chloride being converted to the corresponding titanium oxide.

The reaction of Equation 11 typifies those occurring when olivine is reacted with a chloride or oxychloride of sulphur. Thus when it is reacted with sulfuryl chloride, it is converted to a mixture of magnesium chloride and silica, the sulfuryl chloride being converted to free sulphur (sulphur dioxide).

As has been indicated hereinabove, control of the temperature of the reaction is of the greatest significance in determining the success of the operation. If the temperature is too low, e. g., below about 1300° C., the rate of reaction is too slow to be practical. If, on the other hand the temperature is too high, e. g., above about 1500° C., fusion of the siliceous mixture may occur so that its efficient treatment with a volatile chlorinating agent becomes difficult if not impossible.

Furthermore, the temperature at which the reaction is effected should be sufficiently high to volatilize the magnesium chloride as it is formed, thereby separating it from the unreacted olivine and the residual silica. Since the boiling point of magnesium chloride is about 1412° C., the reaction temperature preferably should be in the neighborhood of this value. The control of the temperature of the reaction mixture is also important when considered from an economic standpoint, it being desirable to operate at temperatures such that full advantage is taken of the heat developed by the exothermic reactions.

It is a primary feature of the present invention that the close control of the reaction temperature required for the successful chlorination of siliceous magnesium minerals and for the separation of the resultant magnesium chloride product from the reaction mixture may be obtained by balancing the exothermic reactions and the endothermic reactions occurring within the reactor. Thus the primary reaction occurring, i. e., the reaction between olivine, chlorine and carbon monoxide to form volatile magnesium chloride, silica, and carbon dioxide (Equation 1) is sufficiently exothermic to provide the heat in an appropriate reactor to maintain the temperature of the reaction mixture at a level of above about 1300° C. This eliminates the necessity of supplying direct heat to the reactor from an external source and preheating of the material entering into the reaction is sufficient.

However, if the reaction mixture tends to overheat, the desired degree of cooling may be obtained by introducing a controlled amount of carbon into the reaction mixture. Since this reacts with the carbon dioxide formed as a product of the primary reaction in an endothermic reaction (Equation 8), the desired degree of cooling may readily be obtained. The introduction of carbon is doubly advantageous because the product carbon monoxide is a desired reacting material aiding in the chlorination of the olivine.

The process of the present invention for the recovery of magnesium from siliceous magnesium minerals now will be described in further detail with particular reference to the flow plan of the single figure of the drawing. In accordance with the procedure illustrated therein, a quantity of olivine or other siliceous mineral which preferably has been reduced to a particle size of about through 100 mesh is introduced into the olivine preheater 9, which serves several functions. In the first place it removes all moisture, combined or uncombined, from the mineral. This is necessary, since at the temperature prevailing in the reactor, any moisture which might be present would react with the carbon to form hydrogen and carbon monoxide by the familiar water-gas reaction. The presence of hydrogen in the reactor would be disadvantageous since it would combine with the chlorine present to form hydrogen chloride which, being substantially non-reactive, will escape from the reactor and cause a loss of chlorine.

In the second place, preheating of the olivine or other mineral is desirable since it converts any magnesium hydroxide or magnesium carbonate which may be present to magnesium oxide, the necessary raw material for the chlorination operation. Finally, preheating of the olivine before introducing it into the reactor serves the useful function of raising its temperature to a level sufficient to initiate its reaction with chlorine and carbon monoxide in the early stages of the operation and of insuring that the magnesium chloride product with which it comes in contact as it is introduced into the reactor is not condensed by coming into contact with cool substance and is discharged from the reactor as a vapor.

The olivine preheater may be an electric furnace or rotary kiln of conventional construction and lined with neutral or basic brick. If not heated electrically, it may be directly fired with oil or powdered carbon to the flame temperature of about 1400° C. Care should be taken not to sinter the charge as it must go to the preheater in finely divided form.

The reactor 10 may be a rotary kiln of conventional construction equipped with an optical pyrometer or other temperature measuring means and tightly sealed to prevent access of air to the interior. This is necessary to the successful operation of the process, since air contains both moisture and oxygen. As indicated above, moisture reacts with carbon to form hydrogen which in turn combines with the chlorine, thereby consuming a portion of this valuable starting material. Oxygen, if introduced into the reactor, will combine with the carbon monoxide to form carbon dioxide, thereby consuming another of the necessary materials for carrying out the desired reaction.

The reactor must be lined with a material which will not react with either chlorine or carbon monoxide at high temperatures. It has been found that a lining of brick comprising silica together with a small amount of calcium oxide (lime) binder is almost ideally suited for this purpose. During operation of the reactor, the silica and the lime initially are attacked by the chlorine to form a small amount of calcium chloride which, being non-volatile, remains on the surface of the lining. Since at the temperature prevailing in the reactor the calcium chloride is semi-fluid and sticky, particles of the kiln charge will adhere to it, thereby forming a relatively thick and effective coating for sealing off the lining and protecting it from the further action of the chlorine.

The reactor preferably is mounted in an inclined manner, the preheated olivine being introduced at the top and gradually making its way downwardly countercurrent to a flow of carbon monoxide and chlorine. As it progresses down the reactor, it is attacked by the chlorine and carbon monoxide, forming silica, magnesium chloride and carbon dioxide as products of the reaction. The silica, being a non-volatile solid, is discharged from the bottom of the reactor. The magnesium chloride, being volatile, concentrates at the top of the reactor and is discharged together with the carbon dioxide. The rotation of the reactor has the advantageous action of agitating the olivine so that the individual particles continually are rubbing against one another. This rubs off the surface coating of silica which develops on each particle as the magnesia content of the olivine reacts with the chlorine and volatilizes. Since such a coating of silica has an insulating effect, its removal is necessary to expose fresh surfaces of the olivine and to permit the complete conversion of the latter into magnesium chloride and silica.

Before being introduced into the reactor, the chlorine or other volatile chlorinating agent is preheated in the chlorine preheater 11 to a temperature of about 1400° C. This preheater is made from chlorine resistant constructional materials and preferably is electrically heated. It feeds into the lower end of the reactor through a conduit 12 of chlorine resistant material, such as graphite.

The carbon monoxide necessary for the reaction may be supplied from any suitable source. It is preferred, however, to generate it in a burner 13 charged with coke, air, and the gases leaving the reactor. The latter contain substantial amounts of carbon dioxide which reacts with the coke contained in the burner to form carbon monoxide by an endothermic reaction. The air reacts with the coke to form carbon monoxide by an exothermic reaction. In operation, these two reactions are balanced so that carbon monoxide is generated and discharged from the burner at a proper temperature, i. e., a temperature of about 1400° C. If desired the coke can be heated electrically so that the amount of nitrogen finally entering the reactor can be controlled without reference to heat needs in the carbon monoxide burner. Generating the necessary amount of carbon monoxide outside the reactor in this manner has the advantage of permitting the use of an inexpensive, high-ash coke as a source material for the carbon monoxide, without the danger of contaminating the charge in the reactor with chlorinated coke ash.

The carbon monoxide burner may be of conventional construction, and preferably is lined with silicon carbide, magnesia, zircon, or other material which will withstand a reducing atmosphere. The carbon monoxide generated therein is discharged into the reactor through the conduit 14, made from or lined with a suitable material, such as silicon carbide.

Carbon is fed into the reactor through line 15 entering the reactor at its lower end. The carbon preferably is in finely divided or powdered form, and may be blown in by suitable impelling apparatus. Means also should be provided for introducing the carbon intermittently and in controlled amounts as necessary to maintain the temperature within the reactor at the desired level.

The silica residue formed as a product of the reaction is discharged from the lower end of the reactor. Emanating from the upper end thereof is a vaporous mixture comprising magnesium chloride vapor and carbon dioxide, which are formed as products of the reactions occurring within the reactor; a substantial volume of nitrogen originally introduced into the reactor via the air charged to the carbon monoxide burner; and a minor proportion of silica and unreacted dust suspended in the gaseous mixture as a result of the tumbling and agitation occurring within the reactor. This effluent mixture is at a temperature which is above the temperature at which magnesium chloride would condense from these gases, i. e., above about 1300° C. at normal atmospheric pressure.

Because of the possibility of the magnesium chloride product being contaminated by the dust present, the latter is removed prior to the condensation of the magnesium chloride. This may be accomplished by any suitable means as, for example, by introducing the vaporous mixture into an electrostatic precipitator 16 (Cottrell type). The precipitator should, of course, be maintained at a temperature of above about 1400° C. in order to insure that the magnesium chloride remains in the vapor state.

After passing through the dust precipitator the gaseous effluent is introduced through line 17 into a cooling device which preferably is the heat exchanger 18. This may be of conventional construction and preferably employs air as the cooling medium. Here the temperature of the gases is reduced to about 700° C., thereby condensing the magnesium chloride vapor and forming solid magnesium chloride in the form of finely divided particles some of which remain in suspension in the carbon dioxide and nitrogen and some of which settle out. Those which settle out can be recovered from the heat exchanger 18.

The cold air which is introduced into the heat exchanger through the line 19 absorbs a portion of the heat of the effluent gases and thereby is heated to a temperature of about 1300° C. A portion of the heated air may be circulated via the line 20 to the olivine preheater where it serves the useful function of supplying at least part of the heat required for the calcination of the olivine. Another portion may be diverted through the line 21 and the valve 22 to the carbon monoxide burner, where it is used to convert the coke to carbon monoxide.

The gaseous effluent which has been cooled to a temperature of about 700° C. in the heat exchanger then passes through the line 23 to the magnesium chloride precipitator 24. This, like the dust precipitator, may be an electrostatic precipitator of the Cottrell type. After neutralization of their electrostatic charges, the solid particles of magnesium chloride, settle out and may be withdrawn from the bottom of the precipitator.

The gases remaining after removal of the magnesium chloride consist principally of carbon dioxide and nitrogen. They may be vented through the line 25 into the atmosphere or, if desired, passed through the line 26 and valve 27 into the reactor where they serve as coolants and as diluents to control the reaction rate. By varying the amount of the mixture of carbon dioxide and nitrogen thus introduced into the reactor, and by controlling the temperature of the mixture as necessary in the reheater 28, further control of the temperature within the reactor may be obtained.

Alternatively, the carbon dioxide and nitrogen which comprise the effluent gases from the magnesium chloride precipitator may be passed through the valves 27 and 22 and the line 29 into the carbon monoxide burner. Here the carbon dioxide content of the gases reacts with the coke contained in the burner to form carbon monoxide, which is fed into the reactor. As pointed out above, the extent to which this reaction occurs may be controlled by regulating the amount of carbon dioxide entering the carbon monoxide burner. The amount of diluent nitrogen entering the reactor may be controlled by regulating the relative amounts of exit gases and air entering the carbon monoxide generator which may have to be externally heated. Use of a relatively large proportion of stack gases in an externally heated carbon monoxide generator has the advantage that any chlorinating agent not consumed during the first pass is again passed over the ore.

When employing a volatile chlorinating agent other than chlorine in the process of the invention, substantially similar apparatus and an operating procedure substantially similar to that outlined above may be employed. Thus a quantity of preheated olivine or other siliceous mineral may be passed countercurrent in a reactor to a quantity of preheated silicon tetrachloride, titanium tetrachloride, sulfuryl chloride or other volatile chlorinating agents at a temperature of between about 1300° C. and about 1500° C. Carbon monoxide may be introduced as required to effect the desired reaction whereby the magnesium content of the olivine is chlorinated selectively. Also, powdered carbon and relatively cool gaseous material such as carbon dioxide and nitrogen may be introduced into the reactor as necessary to maintain the temperature within the desired temperature range. In this case also, the silica products may be discharged from the lower end of the reactor, while the gaseous products comprising vaporous magnesium chloride together with other gases, such as carbon dioxide and nitrogen, may be discharged from the upper end of the reactor. The gaseous mixture leaving the reactor may be passed successively through a dust precipitator, a heat exchanger and a magnesium chloride precipitator to effect the condensation and isolation of the magnesium chloride in the manner indicated above.

It will be apparent that careful control of the relative proportions of the reacting materials is necessary to the economical and successful operation of the hereindescribed chlorination procedure. The amount of chlorinating agent and carbon monoxide introduced into the reactor should be adjusted so that the olivine is completely reacted, none being discharged from the reactor together with the silica. On the other hand, an excessive amount of chlorine and carbon monoxide should not be employed, since in such a case there is loss of these materials in the gases leaving the reactor. Also an excess of chlorine and carbon monoxide is to be avoided, because they are expensive and because if present excess they will react with the silica content of the olivine and form compounds such as silicon tetrachloride and silicon trichloride which are volatile and may escape from the reactor together with the magnesium chloride. As indicated by Equation 1 above, where the chlorinating agent employed is chlorine, substantially equal volumes of chlorine and carbon monoxide should be used.

The process of the invention is illustrated by the following examples:

Example 1

A quantity of olivine preheated to a temperature of 1400° C. may be introduced into a reactor lined with silica brick. A mixture of substantially equal volumes of chlorine and carbon monoxide preheated to a temperature of about 1400° C. then was pased over the olivine. Powdered carbon was introduced into the reactor as necessary to keep the temperature at about 1400° C. During this process the reactor was kept under agitation so as to insure that the silica film formed on each particle as chlorination proceeded was removed by the scrubbing action of one particle against another. The vaporous mixture leaving the reactor was cooled to about 700° C., thereby precipitating the magnesium chloride and separating it from the nitrogen and carbon dioxide content. At the conclusion of the reaction a solid residue comprising substantially pure silica remained within the reactor.

Example 2

In a manner similar to that outlined in Example 1, magnesium chloride is formed and recovered by reacting with chlorine the following siliceous magnesium minerals from which free and combined water is first removed: forsterite, dunite, enstatite, serpentine, siliceous magnesite, and siliceous brucite.

Example 3

A quantity of olivine was chlorinated selectively in substantially the manner outlined in Example 1, with the exception that the chlorinating agent used was carbon tetrachloride. The operation resulted in the selective chlorination of the magnesia content of the olivine to form magnesium chloride which was separated as a vapor from the non-volatile silica, which was substantially unaffected by the conditions prevailing in the reactor.

Example 4

In a manner similar to that set forth in Example 1, but with the exception that titanium tetrachloride was employed as the chlorinating agent, a quantity of olivine was chlorinated with the result that magnesium chloride was formed as a volatile product which separated under the conditions of the reaction from a non-volatile residue comprising silica and some titanium oxide.

Example 5

A quantity of olivine was subjected to the action of a chlorinating agent in a manner substantially the same as that set forth in Example 1 with the exception that sulfuryl chloride was employed as a chlorinating agent. Again magnesium chloride was formed as a vaporous product and separated from the reaction mixture, leaving the silica in the reactor as a non-volatile residue.

In my process I cause a mixture of chlorine and carbon monoxide in equal molal proportions to pass countercurrent to a stream of olivine particles. At the end where the gases enter the reactor magnesium chloride, silica, and some silicon chlorides will be formed. As the gases progress through the reactor the concentrations of chlorine and carbon monoxide are progressively reduced so that whereas at the enrance end of the reactor magnesium chloride is produced according to reaction 1 and silicon tetrachloride is produced according to reaction 3 but at the other end of the reactor practically no magnesium chloride or silicon tetrachloride will be produced by reactions 1 or 3 because the chlorine and carbon monoxide concentrations will have approached zero. But the silicon tetrachloride which was formed in the region of high chlorine and carbon monoxide concentration will interact with any fresh olivine resulting in the formation of magnesium chloride and silica and the recovery of substantially all the chlorine previously lost in the formation of silicon chlorides.

The process of the present invention thus affords a practical, economical method for the recovery of magnesium from olivine and other siliceous magnesium minerals. The process is one which lends itself readily to execution in conventional apparatus. It may be controlled precisely and positively so that the desired reaction occurs without substantial losses from side reactions. Furthermore, the quantities of reacting materials employed may be regulated in such a manner that there is no substantial loss thereof. By taking advantage of the exothermic character of the reactions occurring during the chlorination process, the heat supplied by the reactions themselves may be used to maintain the desired temperature level within the reactor and thus lessen heat supplied from an external source.

Furthermore, the magnesium chloride product is obtained in a substantially pure state. Its separation being effected without the use of water, the product is anhydrous. Hence it need not be subjected to an expensive dehydrating operation before being used in the production of other useful magnesium compounds. The process of the invention thus makes attractive for commercial exploitation the vast deposits of olivine and other siliceous magnesium minerals which heretofore have not been regarded as suitable sources of magnesium and its compounds.

Having now described my invention in preferred embodiments, what I claim as new and desire to protect by Letters Patent is:

1. The process of obtaining magnesium chloride from siliceous magnesium minerals which comprises reacting a siliceous magnesium mineral with a volatile chlorinating agent comprising chlorine and carbon monoxide and at a temperature at which substantially all the magnesium chloride formed passes into the vapor phase but at a temperature below the fusion temperature of the siliceous magnesium mineral residue, thereby selectively converting the magnesium content of the mineral to volatilized magnesium chloride and leaving substantially unaffected the non-volatile siliceous content thereof, and separating the magnesium chloride vapor from the siliceous residue.

2. The process of obtaining magnesium chloride from siliceous magnesium minerals which comprises reacting a siliceous magnesium mineral with a volatile chlorinating agent and a reducing agent and at a temperature of between about 1300° C. and about 1500 C. at substantially one atmosphere pressure, thereby selectively converting substantially all of the magnesium content of the mineral to volatilized magnesium chloride and leaving substantially unaffected the non-volatile siliceous content thereof, and separating the volatilized magnesium chloride from the siliceous residue.

3. The process of obtaining magnesium chloride from siliceous magnesium minerals which comprises reacting a siliceous magnesium mineral with a volatile chlorinating agent at a temperature at which substantially all the magnesium chloride formed passes into the vapor phase but at a temperature below the fusion temperature of the siliceous magnesium mineral residue, thereby selectively converting the magnesium content of the mineral to volatilized magnesium chloride and leaving substantially unaffected the non-volatile siliceous content thereof, and separating the magnesium chloride vapor from the siliceous residue.

4. The process of obtaining magnesium chloride from siliceous magnesium minerals which comprises reacting a siliceous magnesium mineral with a volatile chlorinating agent and a reducing agent comprising a highly chlorinated organic compound and at a temperature at which substantially all the magnesium chloride formed passes into the vapor phase but at a temperature below the fusion temperature of the siliceous magnesium mineral residue, thereby selectively converting the magnesium content of the mineral to volatilized magnesium chloride and leaving substantially unaffected the non-volatile siliceous content thereof, and separating the magnesium chloride vapor from the siliceous residue.

5. The process of obtaining magnesium chloride from siliceous magnesium minerals which comprises reacting a siliceous magnesium mineral with a volatile chlorinating agent and a reducing agent comprising carbon tetrachloride and at a temperature at which substantially all the magnesium chloride formed passes into the vapor phase but at a temperature below the fusion temperature of the siliceous magnesium mineral residue, thereby selectively converting the magnesium content of the mineral to volatilized magnesium chloride and leaving substantially unaffected the non-volatile siliceous content thereof, and separating the magnesium chloride vapor from the siliceous residue.

6. The process of obtaining magnesium chloride from siliceous magnesium minerals which comprises reacting a siliceous magnesium mineral with a volatile chlorinating agent comprising a volatile inorganic chloride and at a temperature at which substantially all the magnesium chloride formed passes into the vapor phase but at a temperature below the fusion temperature of the siliceous magnesium mineral residue, thereby selectively converting the magnesium content of the mineral to volatilized magnesium chloride and leaving substantially unaffected the non-volatile siliceous content thereof, and separating the magnesium chloride vapor from the siliceous residue.

7. The process of obtaining magnesium chloride from siliceous magnesium minerals which comprises reacting a siliceous magnesium mineral with a volatile chlorinating agent comprising titanium tetrachloride and at a temperature at which substantially all the magnesium chloride formed passes into the vapor phase but at a temperature below the fusion temperature of the siliceous magnesium mineral residue, thereby selectively converting the magnesium content of the mineral to volatilized magnesium chloride and leaving substantially unaffected the non-volatile siliceous content thereof, and separating the magnesium chloride vapor from the siliceous residue.

8. The process of obtaining magnesium chloride from siliceous magnesium minerals which comprises reacting a siliceous magnesium mineral with a volatile chlorinating agent and a reducing agent comprising sulfur chloride and at a temperature at which substantially all the magnesium chloride formed passes into the vapor phase but at a temperature below the fusion temperature of the siliceous magnesium mineral residue, thereby selectively converting the magnesium content of the mineral to volatilized magnesium chloride and leaving substantially unaffected the non-volatile siliceous content thereof, and separating the magnesium chloride vapor from the siliceous residue.

9. The process of obtaining magnesium chloride from siliceous magnesium minerals which comprises reacting particles of a siliceous magnesium mineral with a volatile chlorinating agent and a reducing agent and at a temperature at which substantially all the magnesium chloride formed passes into the vapor phase but at a temperature below the fusion temperature of the siliceous magnesium mineral residue, thereby selectively converting the magnesium content of the mineral to volatilized magnesium chloride and leaving a non-volatile residue comprising substantially the siliceous content of the mineral, the reaction being effected with the contemporaneous agitation of the mineral particles, whereby to scrub off the insulating coating of siliceous residue from the outer surface of the particles and thus to insure substantially complete reaction of the mineral with the volatile chlorinating agent, and separating substantially all of the magnesium chloride vapor from the siliceous residue.

10. The process of obtaining magnesium chloride from siliceous magnesium minerals which comprises reacting a siliceous magnesium mineral with a volatile chlorinating agent and a reducing agent, whereby to form as products of an exothermic reaction magnesium chloride, silica, and carbon dioxide; and introducing carbon into the reaction vessel during the course of the reaction to react with the carbon dioxide by an endothermic reaction to form carbon monoxide, the amount of carbon introduced in this manner being adjusted so as to maintain a temperature within the reactor at which substantially all of the magnesium chloride formed passes into the vapor phase but at a temperature below the fusion temperature of the siliceous magnesium mineral residue, thereby selectively converting the magnesium content of the mineral to volatilized magnesium chloride and leaving substantially unaffected the non-volatile siliceous content thereof, and separating the magnesium chloride vapor from the siliceous residue.

11. The process of obtaining magnesium chloride from siliceous magnesium minerals which comprises reacting a siliceous magnesium mineral with chlorine and carbon monoxide to form magnesium chloride, silica, and carbon dioxide as products, the reaction being carried out at a temperature of between about 1300° C. and about 1500° C. at substantially one atmosphere pressure, at which temperature substantially all the magnesium chloride formed is in the vapor phase, separating from the non-volatile siliceous residue a vaporous mixture comprising magnesium chloride and carbon dioxide, and cooling the vaporous mixture to condense the magnesium chloride and thereby effect its separation from the carbon dioxide.

12. The process of obtaining magnesium chloride from olivine which comprises reacting olivine with chlorine and carbon monoxide and at a temperature at which substantially all the magnesium chloride formed passes into the vapor phase but at a temperature below the fusion temperature of the olivine residue, thereby selectively converting the magnesium content of the olivine to volatilized magnesium chloride and leaving substantially unaffected the non-volatile siliceous content thereof, and separating the magnesium chloride vapor from the olivine residue.

13. The process of obtaining magnesium chloride from olivine which comprises reacting olivine with a volatile chlorinating agent and a reducing agent and at a temperature at which substantially all the magnesium chloride formed passes into the vapor phase but at a temperature below the fusion temperature of the olivine residue, thereby selectively converting the magnesium content of the olivine to volatilized magnesium chloride and leaving substantially unaffected the non-volatile siliceous content thereof, and separating the magnesium chloride vapor from the olivine residue.

14. The process of obtaining magnesium chloride from olivine which comprises reacting olivine with a volatile chlorinating agent and a reducing agent comprising a highly chlorinated organic compound and at a temperature at which substantially all the magnesium chloride formed passes into the vapor phase but at a temperature below the fusion temperature of the olivine residue, thereby selectively converting the magnesium content of the olivine to volatilized magnesium chloride and leaving substantially unaffected the non-volatile siliceous content thereof, and separating the magnesium chloride vapor from the olivine residue.

15. The process of obtaining magnesium chloride from olivine which comprises reacting olivine with a volatile chlorinating agent and a reducing agent comprising a volatile inorganic chloride and at a temperature at which substantially all the magnesium chloride formed passes into the vapor phase but at a temperature below the fusion temperature of the olivine residue, thereby selectively converting the magnesium content of the olivine to volatilized magnesium chloride and leaving substantially unaffected the non-volatile siliceous content thereof, and separating the magnesium chloride vapor from the olivine residue.

16. The process of obtaining magnesium chloride from olivine which comprises reacting particles of olivine with a volatile chlorinating agent and a reducing agent and at a temperature at which substantially all of the magnesium chloride formed passes into the vapor phase but at a temperature below the fusion temperature of the olivine residue, thereby selectively converting the magnesium content of the olivine to volatilized magnesium chloride and leaving the non-volatile residue comprising substantially the siliceous content of the olivine, the reaction being effected with the contemporaneous agitation of the olivine particles whereby to scrub off the insulating coating of siliceous residue from the outer surface of the particles and thus insure complete reaction of the olivine with the volatile chlorinating agent and separating substantially all the magnesium chloride vapor from the olivine residue.

17. The process of obtaining magnesium chloride from olivine which comprises reacting olivine with a volatile chlorinating agent and a reducing agent, whereby to form as products of an exothermic reaction magnesium chloride, silica, and carbon dioxide, introducing carbon into the reaction vessel during the course of the reaction to react with the carbon dioxide by an endothermic reaction to form carbon monoxide the amount of carbon introduced in this manner being adjusted so as to maintain a temperature within the reactor at which substantially all of the magnesium chloride formed passes into the vapor phase but at a temperature below the fusion temperature of the olivine residue, and separating the magnesium chloride vapor from the olivine residue.

KERMIT B. BENGTSON.

REFERENCES CITED

The following references are of record in the file of this patent:

UNITED STATES PATENTS

| Number | Name | Date |
|---|---|---|
| 2,216,402 | Muller | Oct. 1, 1940 |
| 2,349,556 | Kleckner | May 23, 1944 |
| 2,355,367 | Cooper | Aug. 8, 1944 |

OTHER REFERENCES

Doerner et al., "Chlorination of Magnesia," Dec. 1, 1945, Bureau of Mines Publication, R. I. 3833.